(12) United States Patent
Isozaki et al.

(10) Patent No.: US 6,926,992 B2
(45) Date of Patent: Aug. 9, 2005

(54) NONAQUEOUS ELECTROLYTE SECONDARY BATTERY

(75) Inventors: Yoshiyuki Isozaki, Tokyo (JP); Yuji Satoh, Sagamihara (JP); Motoya Kanda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 251 days.

(21) Appl. No.: 10/184,851

(22) Filed: Jul. 1, 2002

(65) Prior Publication Data

US 2003/0031919 A1 Feb. 13, 2003

(30) Foreign Application Priority Data

Jun. 29, 2001 (JP) ........................................ 2001-198327

(51) Int. Cl.$^7$ .......................... H01M 10/52; H01M 2/12
(52) U.S. Cl. ............................ 429/59; 429/53; 429/56; 429/82; 429/175
(58) Field of Search ............................. 429/53, 54, 56, 429/57, 59, 82, 175

(56) References Cited

U.S. PATENT DOCUMENTS

| | | | |
|---|---|---|---|
| 5,741,606 A | * | 4/1998 | Mayer et al. ................. 429/53 |
| 6,037,071 A | * | 3/2000 | Poirier et al. .................. 429/7 |
| 6,210,824 B1 | * | 4/2001 | Sullivan et al. ............... 429/53 |
| 6,270,918 B1 | * | 8/2001 | Wu ............................... 429/56 |
| 6,531,242 B1 | * | 3/2003 | Sugimoto et al. ............. 429/82 |
| 6,620,544 B1 | * | 9/2003 | Shin et al. .................... 429/56 |
| 6,723,465 B2 | * | 4/2004 | Segawa et al. ............... 429/56 |
| 6,805,991 B2 | * | 10/2004 | Abe ............................. 429/56 |

FOREIGN PATENT DOCUMENTS

JP         9-92335        4/1997

OTHER PUBLICATIONS

Kinzoku (Metal) Date Book, Second Revision compiled by Nippon Metal Institute and published by Maruzen K. K. on Jan. 30, 1984, 9 pages, discussion in specification only–p. 12.

* cited by examiner

Primary Examiner—Tracy Dove
(74) Attorney, Agent, or Firm—Oblon, Spivak, McClelland, Maier & Neustadt, P.C.

(57) ABSTRACT

Disclosed is a nonaqueous electrolyte secondary battery comprises a sealing unit including a conductive support plate, wherein the conductive support plate contains at least one kind of a conductive material selected from the group consisting of a metal, an alloy and a composite metallic material, each of the metal, the alloy and the composite metallic material has a modulus of elasticity (Young's modulus) at 25° C. that falls within a range from $1 \times 10^{11}$ Pa to $3.27 \times 10^{11}$ Pa, and the conductive support plate has an area resistance value RS at 20° C. falling within a range from 0.032 ($\mu\Omega \cdot cm^2$) to 1.24 ($\mu\Omega \cdot cm^2$).

20 Claims, 3 Drawing Sheets

NONAQUEOUS ELECTROLYTE SECONDARY BATTERY

CROSS-REFERENCE TO RELATED APPLICATIONS

This application is based upon and claims the benefit of priority from the prior Japanese Patent Application No. 2001-198327, filed Jun. 29, 2001, the entire contents of which are incorporated herein by reference.

BACKGROUND OF THE INVENTION

1. Field of the Invention

The present invention relates to a nonaqueous electrolyte secondary battery.

2. Description of the Related Art

In recent years, a nonaqueous electrolyte secondary battery such as a lithium-ion secondary battery or a polymer lithium secondary battery is widely used in an electronic appliance such as a portable telephone. These secondary batteries of this type have a lightweight, a high energy density, and provide a high operating voltage near 4V compared with a nickel-cadmium battery or a nickel-metal hydride secondary battery. The excellent performance of the secondary battery of the type noted above attracts keen attentions in this technical field.

In recent years, it is studied to use the particular nonaqueous electrolyte secondary battery as a power source for an electric vehicle, an electric tool, uninterruptible power supply or a cordless cleaner. In such a use, required is high power performance, compared with a nonaqueous electrolyte secondary battery used in an electronic appliance such as a portable telephone.

In order to increase the high rate discharge capacity of the battery for obtaining a high power battery, it is necessary to decrease the internal resistance of the battery as much as possible. For decreasing the internal resistance of the battery, it is important to lower the resistance of the electrode and the component parts to increase the current collecting efficiency. A measure for achieving the object is the development of a cylindrical lithium-ion secondary battery or a prismatic lithium-ion secondary battery comprising a plurality of current collecting leads connected to an electrode, as proposed in, for example, Jpn. Pat. Appln. KOKAI Publication No. 9-92335. The particular construction makes it possible to improve the current collecting efficiency, to lower the internal resistance of the cell, and to obtain a battery excellent in the high rate discharge characteristics. Also, in a high rate discharge type lithium secondary battery of this type, it is possible to charge the secondary battery with a large current so as make it possible to achieve a rapid charging.

In a nonaqueous electrolyte secondary battery, it is strongly required in general to ensure the safety in the event of an abnormal increase in the internal pressure of the cell caused by the inappropriate handling such as the situation that the secondary battery is left to stand under a high temperature atmosphere for a long time, an overcharge, or an external short-circuiting, not to mention the safety of the secondary battery during the normal use. In order to ensure the safety, the nonaqueous electrolyte secondary battery is provided with a safety vent that is operated by the internal pressure of the cell battery, thereby preventing the explosion of the battery. In the nonaqueous electrolyte secondary battery of this type, the safety vent is opened when the internal pressure of the cell is increased to exceed a designed operation pressure to release the gas filling the inner space of the battery container to the outside through the opened safety vent, thereby preventing the explosion of the battery.

However, in the high rate discharge type nonaqueous electrolyte secondary battery, the operating pressure of the safety vent is nonuniform, giving rise to the inconvenience that it is possible for the safety vent not to be operated even in the case where the internal pressure of the cell is increased to reach a designed operation pressure by the occurrence of an abnormality such as an overcharge.

BRIEF SUMMARY OF THE INVENTION

An object of the present invention is to provide a nonaqueous electrolyte secondary battery, which permits suppressing the nonuniformity of the operating pressure of the safety vent so as to improve the reliability of the safety vent and, thus, to prevent the explosion of the battery.

According to a first aspect of the present invention, there is provided a nonaqueous electrolyte secondary battery, comprising:

a case;

an electrode group provided in the case and including a positive electrode, a negative electrode and a nonaqueous electrolyte; and a sealing unit arranged in an open portion of the case, the sealing unit including a conductive safety vent comprising a rupture portion that is ruptured by the increase in the internal pressure of the case, a positive electrode terminal, and a conductive support plate arranged between the conductive safety vent and the positive electrode terminal, wherein the conductive support plate contains at least one kind of a conductive material selected from the group consisting of a metal having a modulus of elasticity (Young's modulus) at 25° C. falling within a range from $1 \times 10^{11}$ Pa to $3.27 \times 10^{11}$ Pa, an alloy having a modulus of elasticity (Young's modulus) at 25° C. falling within a range from $1 \times 10^{11}$ Pa to $3.27 \times 10^{11}$ Pa, and a composite metallic material having a modulus of elasticity (Young's modulus) at 25° C. falling within a range from $1 \times 10^{11}$ Pa to $3.27 \times 10^{11}$ Pa, and the conductive support plate having an area resistance value RS at 20° C. falling within a range from 0.032 ($\mu\Omega \cdot cm^2$) to 1.24 ($\mu\Omega \cdot cm^2$).

Further, according to a second aspect of the present invention, there is provided a nonaqueous electrolyte secondary battery, comprising:

a case;

an electrode group provided in the case and including a positive electrode, a negative electrode and a nonaqueous electrolyte; and a sealing unit arranged in an open portion of the case, the sealing unit including a conductive safety vent comprising a rupture portion that is ruptured by the increase in the internal pressure of the case, a positive electrode terminal, and a conductive support plate arranged between the safety vent and the positive electrode terminal, the conductive support plate contains at least one kind of a conductive material selected from the group consisting of an alloy containing a metal element having a modulus of elasticity (Young's modulus) at 25° C. falling within a range from $1 \times 10^{11}$ Pa to $3.27 \times 10^{11}$ Pa, and a composite metallic material containing a metal element having a modulus of elasticity (Young's modulus) at 25° C. falling within a range from $1 \times 10^{11}$ Pa to $3.27 \times 10^{11}$ Pa, and the conductive support plate having an area resistance value RS at 20° C. falling within a range from 0.032 ($\mu\Omega \cdot cm^2$) to 1.24 ($\mu\Omega \cdot cm^2$).

Further, according to a third aspect of the present invention, there is provided a nonaqueous electrolyte secondary battery, comprising:

a case;

an electrode group provided in the case and including a positive electrode, a negative electrode and a nonaqueous electrolyte; and a sealing unit arranged in an open portion of the case, the sealing unit including a conductive safety vent comprising a rupture portion that is ruptured by the increase in the internal pressure of the case, a positive electrode terminal, and a conductive support plate arranged between the safety vent and the positive electrode terminal, the conductive support plate comprises a supporting body and a surface layer formed on at least a part of a surface of the supporting body, each of the supporting body and the surface layer contains a metal element having a modulus of elasticity (Young's modulus) at 25° C. that falls within a range from $1\times10^{11}$ Pa to $3.27\times10^{11}$ Pa.

DETAILED DESCRIPTION OF THE INVENTION

Figure 8:
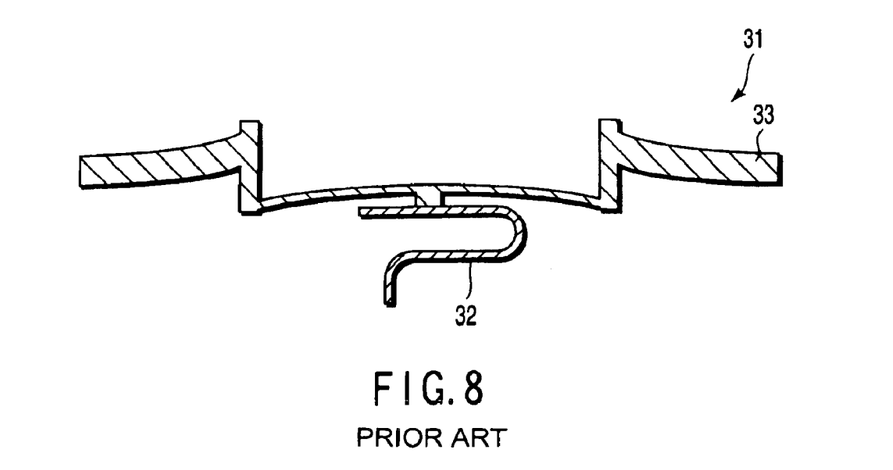
FIG. 8 is a cross sectional view showing the construction of the safety vent used in the conventional nonaqueous electrolyte secondary battery.

The inconvenience of the safety vent is considered to be caused as follows. Specifically, FIG. 8 is a cross sectional view showing the construction of a conventional safety vent. As shown in the drawing, a safety vent 31 is electrically connected to a positive electrode lead 32 and exposed to the atmosphere within the cell, with the result that the safety vent 31 tends to be corroded by the nonaqueous electrolyte or to be subjected to an electrochemical corrosion. In order to prevent the corrosion, it is desirable for the safety vent 31 to be formed of aluminum. However, aluminum has a high ductility, i.e., has a low bending rigidity. Therefore, the safety vent 31 is pushed upward if the internal pressure of the cell begins to be increased, with the result that a peripheral portion 33 of the safety vent 31 is deformed, as shown in FIG. 8. Further, an additional problem is generated that, even if the safety vent 31 having a mechanical strength as designed is prepared, a boundary between the peripheral portion 33 and a rupture portion is corroded by the nonaqueous electrolyte, resulting in failure to obtain a mechanical strength as designed. Because of generation of the particular problem, if the peripheral portion 33 of the safety vent is much deformed, the rupture portion is not ruptured promptly in some cases even if the internal pressure of the cell is increased to reach a designed operation pressure.

As a result of an extensive research conducted by the present inventors in an attempt to overcome the problems noted above, it has been found that a nonaqueous electrolyte secondary battery satisfying both the high rate discharge characteristics and the safety can be obtained by arranging a conductive support plate having a prescribed bending rigidity and a resistance value on the peripheral portion of the safety vent.

To be more specific, the nonaqueous electrolyte secondary battery according to the present invention comprises an electrode group including a positive electrode, a negative electrode, and a nonaqueous electrolyte arranged between the positive electrode and the negative electrode, a battery case electrically connected to the negative electrode, a conductive safety vent that is arranged in the open portion of the battery case to seal the battery case and is ruptured by the increase in the internal pressure of the cell, and a positive electrode terminal electrically connected to the positive electrode with the safety vent interposed therebetween. The nonaqueous electrolyte secondary battery of the present invention is featured in that a conductive support plate described below is arranged between the safety vent and the positive electrode terminal so as to fix the peripheral portion of the safety vent.

The conductive support plate used in the secondary battery of the present invention contains at least one kind of a conductive material selected from the group consisting of a first metal having a modulus of elasticity (Young's modulus) at 25° C. falling within a range from $1\times10^{11}$ Pa to $3.27\times10^{11}$ Pa, a first alloy having a modulus of elasticity (Young's modulus) at 25° C. falling within a range from $1\times10^{11}$ Pa to $3.27\times10^{11}$ Pa, a first composite metallic material having a modulus of elasticity (Young's modulus) at 25° C. falling within a range from $1\times10^{11}$ Pa to $3.27\times10^{11}$ Pa, a second alloy containing a metal element having a modulus of elasticity (Young's modulus) at 25° C. falling within a range from $1\times10^{11}$ Pa to $3.27\times10^{11}$ Pa, and a second composite metallic material containing a metal element having a modulus of elasticity (Young's modulus) at 25° C. falling within a range from $1\times10^{11}$ Pa to $3.27\times10^{11}$ Pa. It is possible for the modulus of elasticity (Young's modulus) at 25° C. of the conductive support plate to be equal to or to differ from the modulus of elasticity (Young's modulus) at 25° C. of at least one kind of the conductive material noted above.

Also, the conductive support plate used in the present invention has an area resistance value RS at 20° C. falling within a range from 0.032 $\mu\Omega\cdot cm^2$ to 1.24 $\mu\Omega\cdot cm^2$.

If the modulus of elasticity is smaller than $1\times10^{11}$ Pa, the ductility of the conductive support plate is increased, with the result that the peripheral portion of the safety vent tends to be deformed when the internal pressure of the cell is increased so as to make it difficult to suppress the nonuniformity in the operating pressure of the safety vent. On the other hand, it is difficult to process easily a conductive material having a Young's modulus at 25° C. exceeding $3.27\times10^{11}$ Pa and a conductive material containing a metal element having a Young's modulus at 25° C. exceeding $3.27 \times 10^{11}$ Pa for forming a conductive support plate, with the result that the mass productivity of the secondary battery tends to be impaired. It is desirable for the conductive support plate to be formed of a material having the modulus of elasticity (Young's modulus) at 25° C. falling within a range from $1.36 \times 10^{11}$ Pa to $2.2 \times 10^{11}$ Pa. Where the modulus of elasticity (Young's modulus) falls within the range noted above, the effect of improving the safety is increased.

The metal having a modulus of elasticity (Young's modulus) at 25° C. falling within a range from $1 \times 10^{11}$ Pa to $3.27 \times 10^{11}$ Pa includes, for example Co (from $2.1 \times 10^{11}$ Pa to $2.2 \times 10^{11}$ Pa), Cr ($2.53 \times 10^{11}$ Pa), Cu ($1.36 \times 10^{11}$ Pa), Fe ($1.90 \times 10^{11}$ Pa), Mo ($3.27 \times 10^{11}$ Pa), Ni ($2.05 \times 10^{11}$ Pa), Ta ($1.811 \times 10^{11}$ Pa) and V ($1.326 \times 10^{11}$ Pa). Particularly, it is desirable to use Ni, Cu or both of Ni and Cu as the metal having the modulus of elasticity noted above.

The modulus of elasticity (Young's modulus) at 25° C. of each of the metal elements is based on "International Tables of Selected Constants, 16, Metals, Thermal and Mechanical Data" given in Tables 1 and 2•3•1 on page 35 of "Kinzoku (Metal) Data Book, Second Revision" compiled by Nippon Metal Institute and published by Maruzen K. K. on Jan. 30, 1984. The modulus of elasticity (Young's modulus) is denoted by the unit "dyn/cm$^2$" in the Table given above, and the unit is converted into "Pa" in this specification.

It is desirable for the first alloy having the modulus of elasticity (Young's modulus) at 25° C. falling within a range from $1 \times 10^{11}$ Pa to $3.27 \times 10^{11}$ Pa to have a composition containing at least one element selected from the group consisting of Ni and Cu. Particularly, it is desirable for the first alloy to have a composition containing Ni and Fe. In the case of using the particular alloy, it is possible to further improve the safety of the secondary battery.

The first composite metallic material used in the present invention for forming the conductive support plate includes, for example, a metal plate having a metal layer or an alloy layer formed on at least a part of the surface by, for example, the plating, an alloy plate having a metal layer or an alloy layer formed on at least a part of the surface by, for example, the plating, a clad material, a metal mesh supporting a material containing a metal or an alloy, or a mixture containing at least one of a metal and an alloy, and a binder.

It is desirable for the first composite metallic material having a modulus of elasticity (Young's modulus) at 25° C. falling within a range from $1 \times 10^{11}$ Pa to $3.27 \times 10^{11}$ Pa to have a composition containing at least one kind of an element selected from the group consisting of Ni and Cu. Particularly, it is desirable for the first composite metallic material to have a composition containing both Ni and Cu. In the case of using the particular composite metallic material, it is possible to further improve both the high rate discharge characteristics and the safety of the secondary battery.

The second alloy used in the present invention for forming the conductive support plate, the second alloy containing a metal element having a modulus of elasticity (Young's modulus) at 25° C. falling within a range from $1 \times 10^{11}$ Pa to $3.27 \times 10^{11}$ Pa, includes, for example, alloys containing at least one kind of a metal element selected from the group consisting of Co, Cr, Cu, Fe, Mo, Ni, Ta and V. Among the alloys noted above, it is desirable to use an alloy containing at least one metal element selected from the group consisting of Ni and Cu. Particularly, it is desirable to use the Ni—Fe alloy because the alloy permits further improving the safety of the secondary battery.

The second conductive support plate containing a composite metallic material, which is used in the present invention, said second composite metallic material containing a metal element having a modulus of elasticity (Young's modulus) at 25° C. falling within a range from $1 \times 10^{11}$ Pa to $3.27 \times 10^{11}$ Pa, includes, for example, a structure comprising a support body and a surface layer formed in at least a part of the surface of said support body, a clad material containing said metal element, a metal mesh supporting a conductive powder, and a mixture containing a metal powder and a binder. At least one of the support body and the surface layer noted above is formed of a metal element having a modulus of elasticity (Young's modulus) at 25° C. falling within a range from $1 \times 10^{11}$ Pa to $3.27 \times 10^{11}$ Pa or an alloy containing the metal element noted above. Also, at least one of the metal mesh and the conductive powder contains a metal element having a modulus of elasticity (Young's modulus) at 25° C. falling within a range from $1 \times 10^{11}$ Pa to $3.27 \times 10^{11}$ Pa.

Particularly, it is desirable to use a conductive support plate comprising a conductive support body containing the metal element noted above and a surface layer formed in at least a part of the surface of the support body and containing the metal element. In the case of using the particular conductive support plate, it is possible to further improve both the high rate discharge characteristics and the safety of the secondary battery.

Each of the first composite metal material containing both Ni and Cu and the second composite metal material containing both Ni and Cu includes, for example, a Cu-containing plate having both main surfaces plated with Ni. It is desirable for the sum of the thickness of the first plated Ni-containing layer on one main surface of the Cu-containing plate and the thickness of the second plated Ni-containing layer on the other main surface of the Cu-containing plate to fall within a range from 2 μm to 10 μm. If the total thickness of the first and second plated Ni-containing layers is smaller than 2 μm, the resistance to corrosion of the conductive support plate caused by the nonaqueous electrolyte is lowered, with the result that the high rate discharge characteristics or the safety of the secondary battery tend to be impaired. On the other hand, if the total thickness of the first and second plated Ni-containing layers exceeds 10 μm, it is possible for the manufacturing cost to be increased. It is more desirable for the total thickness of the first and second plated Ni-containing layers to fall within a range from 4 μm to 6 μm.

In the first composite metal material and the second composite metal material, it is desirable for the clad material containing both Ni and Cu to comprise a Cu-containing layer and nickel-containing layers laminated on both surfaces of the Cu-containing layer. The term "clad material" noted above represents a composite metal material prepared by making integral at least two different kinds of metal bodies such that the interfaces of the different kinds of metal bodies are fused to each other by the diffusion joining. The clad material can be commercially manufactured by, for example, the sintering or diffusion annealing method in which the raw material is subjected to a hot rolling or cold rolling, followed by heating the rolled raw material in, for example, an electric furnace. Also, where the thickness of the Cu-containing layer is set at 1, it is desirable for the total thickness of the Ni-containing layers plated on both surfaces of the Cu-containing layer to fall within a range of between 0.1 and 1. If the total thickness of the Ni-containing layers is smaller than 0.1 relative to the thickness of the Cu-containing layer that is set at 1, the bonding strength at the interface between the Cu-containing layer and the Ni-containing layers tends to be lowered, with the result that a clearance tends to be generated in the bonding interface and that the Ni-containing layers tend to be peeled off the Cu-containing layer. On the other hand, if the total thickness of the Ni-containing layers exceeds 1 relative to the thickness of the Cu-containing layer that is set at 1, the area resistance value at 20° C. of the conductive support plate tends to be increased. It is more desirable for the total thickness of the Ni-containing layers relative to the thickness of the Cu-containing layer that is set at 1 to fall within a range from 0.25 to 0.5.

It is possible for each of the first alloy, the second alloy, the first composite metal material and the second composite metal material to contain additional elements such as Ti.

In the nonaqueous electrolyte secondary battery of the present invention, it is desirable for the conductive material noted above to be formed of a metal selected from the group consisting of nickel, copper, and a metallic material containing nickel or copper as a main component.

It is desirable for the conductive support plate to contain the material or the metal element in amount falling within a range from 80 to 100% by weight. Incidentally, the material is at least one kind of the conductive material selected from the group consisting the first metal, the first alloy and the first composite metallic material. Also, the metal element has a modulus of elasticity (Young's modulus) at 25° C. that falls within a range from $1 \times 10^{11}$ Pa to $3.27 \times 10^{11}$ Pa.

If either the amount of said at least one kind of the conductive material or the amount of said metal element contained in the conductive support plate is smaller than 80% by weight, it is difficult to suppress sufficiently the deformation in the peripheral portion of the safety vent when the internal pressure of the cell is increased, with the result that the nonuniformity in the operating pressure of the safety vent tends to be increased. It is more desirable for the amount of the at least one kind of the conductive material noted above to fall within a range from 90 to 100% by weight, most desirably from 95 to 100% by weight. On the other hand, it is more desirable for the amount of the metal element noted above to fall within a range from 90 to 100% by weight, most desirably from 95 to 100% by weight.

The area resistance value RS at 20° C. of the conductive support plate is calculated by formula (1) given below:

$$RS = R \times S \quad (1)$$

where R represents the resistance value ($\mu\Omega$) at 20° C. of the conductive support plate, and S represents the area (cm$^2$) of the main surface of the conductive support plate. Where the conductive support plate is shaped, for example, annular as shown in the plan view of FIG. 5, the region of half-tone dot meshing in FIG. 5 denotes the main surface of the conductive support plate.

The resistance value ($\mu\Omega$) at 20° C. of the conductive support plate can be measured by, for example, a four-probes method.

The four-probes method is a method in which the current and the voltage are measured by different circuits. Specifically, a current up to 1A is allowed to flow through two optional points of the conductive support plate for the time not exceeding 5 seconds so as to measure the voltage at the measuring point. The resistance value is calculated by the Ohm's law from the relationship between the flowing current and the measured voltage. It is necessary for the measurement to be performed under the condition that a sufficiently uniform temperature is maintained in the environment in which the conductive support plate is positioned and that it needs for the measurement to prevent from being affected by both of the heat radiation and the compulsory flow of the air. Also, the allowable deviation in the temperature at which the resistance value is measured should be 20° C.±2° C.

If the surface resistance value RS at 20° C. of the conductive support plate exceeds 1.24 $\mu\Omega \cdot$cm$^2$, the high rate discharge characteristics of the nonaqueous electrolyte secondary battery are lowered. On the other hand, the high rate discharge characteristics of the secondary battery are improved with decrease in the area resistance value RS. However, a large current tends to flow easily through the secondary battery in the event of the abnormality such as an overcharge. Therefore, if the area resistance value RS at 20° C. of the conductive support plate is smaller than 0.032 $\mu\Omega \cdot$cm$^2$, a rapid temperature elevation or a gas generation tend to take place in the event of an abnormality such as an overcharge so as to increase the probability of bringing about the explosion or ignition. It is desirable for the area resistance value RS at 20° C. of the conductive support plate to fall within a range from 0.05 $\mu\Omega \cdot$cm$^2$ to 0.35 $\mu\Omega \cdot$cm$^2$. If the area surface resistance value RS falls within the range noted above, the high rate discharge characteristics of the secondary battery can be markedly improved. It is more desirable for the area resistance value RS at 20° C. of the conductive support plate to fall within a range from 0.05 $\mu\Omega \cdot$cm$^2$ to 0.21 $\mu\Omega \cdot$cm$^2$.

In the nonaqueous electrolyte secondary battery of the present invention, the peripheral portion of the safety vent is firmly supported by the conductive support plate. Therefore, the peripheral portion of the safety vent is not deformed even if the internal pressure of the cell is increased by the occurrence of an abnormality such as an overcharge. It follows that the rupture portion is promptly ruputured in the case where the internal pressure of the cell is increased to exceed a designed operation pressure. As a result, the gas filling the inner space of the battery case is released to the outside so as to prevent the explosion of the battery. As a result, it is possible to realize a nonaqueous electrolyte secondary battery excellent in both of the high rate discharge characteristics and safety.

The thickness of the conductive support plate can be set at an optional value as far as the area resistance value RS at 20° C. falls within the range specified in the present invention. However, it is desirable for the thickness of the conductive support plate to fall within a range from 0.2 mm to 0.5 mm. If the thickness of the conductive support plate exceeds 0.5 mm, an inconvenience tends to take place in the caulking process so as to bring about leakage of the electrolyte. On the other hand, if the thickness of the conductive support plate is smaller than 0.2 mm, it is difficult to obtain a sufficient effect of improving the safety. It is more desirable for the thickness of the conductive support plate to fall within a range from 0.25 mm to 0.35 mm.

The positive electrode, the negative electrode and the nonaqueous electrolyte included in the nonaqueous electrolyte secondary battery of the present invention will now be described.

a) Positive Electrode

The positive electrode comprises a current collector and an cathode material layer supported on one surface or both surfaces of the current collector.

The positive electrode can be prepared by, for example, coating one surface or both surfaces of a current collector with a paste of a mixture obtained by dispersing a cathode material, a conductive agent and a binder in a suitable solvent, followed by drying and, then, pressing the coating formed on the current collector.

The cathode material used in the present invention includes, for example, $LiCoO_2$, a lithium composite metal oxide having an olivine structure such as $LiFePO_4$ and a lithium composite metal oxide represented by the composition formula $LiCo_{1-x}M_xO_2$ or $LiNi_{1-x}M_xO_2$, where M represents at least one kind of an element, and x is larger than 0 and not larger than 0.5, i.e., $0<x\leq0.5$. To be more specific, the lithium composite metal oxides represented by the composition formulas noted above include, for example, $LiCo_{1-x}Ni_xO_2$, $LiNi_{1-x}Co_xO_2$, $LiNi_{1-x-y}Co_xAl_yO_2$, and $LiNi_{1-x-y}Co_xMn_yO_2$, where x is larger than 0 and not larger than 0.5, i.e., $0<x\leq0.5$, y is not smaller than 0 and smaller than 0.5, i.e., $0\leq y<0.5$, and x+y is larger than 0 and not larger than 0.5, i.e., $0<x+y\leq0.5$.

It is possible to use a mixture of a plurality of these lithium composite metal oxides as the cathode material. The cathode material of this type includes, for example, a mixture of a lithium nickel composite metal oxide and a Spinel type lithium manganese oxide. The lithium composite oxides used in the present invention includes, for example, lithium nickel composite oxides represented by chemical formulas of $LiNiO_2$, $LiNi_{0.7}Co_{0.3}O_2$, $LiCo_{0.8}Ni_{0.2}O_2$, $Li_{1.75}Ni_{0.755}Co_{0.17}O_{1.9}F_{0.1}$, $Li_{1.10}Ni_{0.74}Co_{0.16}O_{1.85}F_{0.15}$, $Li_{1.75}Ni_{0.705}Co_{0.17}Al_{0.05}O_{1.9}F_{0.1}$, $Li_{1.10}Ni_{0.72}Co_{0.16}Nb_{0.20}O_{1.85}F_{0.15}$ and $LiNi_{1-x-y}Co_xM_yO_2$, where M represents at least one element selected from the group consisting of Al, B and Nb, x is larger than 0 and not larger than 0.5, i.e., $0<x\leq0.5$, y is larger than 0 and smaller than 0.5, i.e., $0<y<0.5$, and x+y is larger than 0 and not larger than 0.5, i.e., $0<x+y\leq0.5$.

Particularly, it is desirable to use the lithium nickel composite oxide represented by the composition formula $LiNi_{1-x-y}Co_xM_yO_2$, where M represents at least one element selected from the group consisting of Al, B and Nb, x is larger than 0 and not larger than 0.5, i.e., $0<x\leq0.5$, y is larger than 0 and smaller than 0.5, i.e., $0<y<0.5$, and x+y is larger than 0 and not larger than 0.5, i.e., $0<x+y\leq0.5$. To be more specific, it is desirable to use $LiNi_{1-x-y}Co_xAl_yO_2$, $LiNi_{1-x-y}Co_xB_yO_2$, $LiNi_{1-x-y}Co_xNb_yO_2$, and $LiNi_{1-a-b-c}Co_aAl_bNb_cO_2$, where x is larger than 0 and not larger than 0.5, i.e., $0<x\leq0.5$, y is larger than 0 and smaller than 0.5, i.e., $0<y<0.5$, and x+y is larger than 0 and not larger than 0.5, i.e., $0<x+y\leq0.5$, "a" is larger than 0 and not larger than 0.5, i.e., $0<a\leq0.5$, b is larger than 0 and smaller than 0.5, i.e., $0<b<0.5$, c is larger than 0 and smaller than 0.5, i.e., $0<c<0.5$, and a+b+c is larger than 0 and not larger than 0.5, i.e., $0<a+b+c\leq0.5$. The particular lithium nickel composite metal oxide is high in its thermal stability and, thus, is excellent in its safety.

The Spinel type lithium manganese oxides used in the present invention include, for example, $Li_{1+a}Mn_{2-a}O_4$, $Li_{1+a}Mn_{2-a-b}Co_bO_4$, $Li_{1+a}Mn_{2-a-b}Al_bO_4$, $Li_{1+a}Mn_{2-a-b}Fe_bO_4$, $Li_{1+a}Mn_{2-a-b}Mg_bO_4$, $Li_{1+a}Mn_{2-a-b}Ti_bO_4$, $Li_{1+a}Mn_{2-a-b}Nb_bO_4$, and $Li_{1+a}Mn_{2-a-b}Ge_bO_4$, where "a" is larger than 0, i.e., $0<a$, and a+b is smaller than 2, i.e., $2>a+b$.

The conductive agent used in the present invention includes, for example, acetylene black, carbon black, artificial graphite, and natural graphite.

The binder used in the present invention includes, for example, polytetrafluoro ethylene (PTFE), polyvinylidene fluoride (PVdF), a modified PVdF having at least one of hydrogen and fluorine of PVdF replaced by another substituent, a vinylidene fluoride-hexafluoro propylene copolymer, and a vinylidene fluoride-tetrafluoro ethylene-hexafluoro propylene terpolymer.

The organic solvent used in the present invention for dispersing the binder includes, for example, N-methyl-2-pyrrolidone (NMP) and dimethyl formamide (DMF).

Further, the current collector used in the present invention includes, for example, an aluminum foil, a stainless steel foil and a titanium foil each having a thickness of, for example, 10 to 25 $\mu m$.

In the nonaqueous electrolyte secondary battery of the present invention, it is desirable for the thickness of the active material layer formed on one surface of the positive electrode to fall within a range from 30 $\mu m$ to 100 $\mu m$. If the thickness noted above falls within the range noted above, the high rate discharge characteristics of the secondary battery are improved. It is more desirable for the thickness noted above to fall within a range from 50 $\mu m$ to 65 $\mu m$.

It is desirable for the loading density of the cathode material layer after the pressing step to be not lower than 2.7 $g/cm^3$, more desirably to be not lower than 3.0 $g/cm^3$. If the loading density is not lower than 3.0 $g/cm^3$, it is possible to increase the capacity of the secondary battery. If the loading density is excessively high, however, the high rate discharge characteristics of the secondary battery tend to be lowered. Therefore, it is desirable for the upper limit in the loading density of the cathode material layer to be 3.5 $g/cm^3$.

b) Negative Electrode

The negative electrode mixture used in the present invention includes, for example, a carbonaceous material capable of absorbing-desorbing lithium ions, a chalcogen compound capable of absorbing-desorbing lithium ions, and a light metal. Particularly, it is desirable to use a negative electrode containing a carbonaceous material or a chalcogen compound capable of absorbing-desorbing lithium ions because the particular negative electrode permits improving the battery characteristics such as the charge-discharge cycle life of the secondary battery.

The carbonaceous material capable of absorbing-desorbing lithium ions, which is used in the present invention, includes, for example, coke, a carbon fiber, a vapor-grown-carbon material, a resin calcined body, graphite, mesophase pitch based carbon fiber and a mesophase spherical carbon. Particularly, it is desirable to use a mesophase pitch based carbon fiber or a mesophase spherical carbon that are graphitized under temperatures not lower than 2,500° C. because the electrode capacity can be increased.

The chalcogen compounds capable of absorbing and releasing lithium ions, which can be used in the present invention, include, for example, titanium disulfide ($TiS_2$), molybdenum disulfide ($MoS_2$), and niobium selenide ($NbSe_2$). In the case of using such a chalcogen compound for forming the negative electrode, the voltage of the secondary battery is certainly lowered. However, the capacity of the negative electrode is increased so as to increase the capacity of the secondary battery. Further, since the negative electrode has a high lithium ion diffusion rate, the rapid charge-discharge performance of the secondary battery is improved.

The light metals used in the present invention include, for example, aluminum, an aluminum alloy, a magnesium alloy, a lithium metal and a lithium alloy.

The negative electrode containing a carbonaceous material can be prepared by, for example, coating one surface or both surfaces of a current collector with a paste of a negative electrode mixture obtained by dispersing a carbonaceous material, a conductive agent and a binder in a suitable solvent, followed by drying and, then, pressing the coating formed on the current collector.

The binder used for preparing the paste of the negative electrode mixture includes, for example, polytetrafluoro ethylene (PTFE), polyvinylidene fluoride (PVdF), ethylene-propylene-diene copolymer (EPDM), and styrene-butadiene rubber (SBR).

The current collector used for preparing the negative electrode includes, for example, a copper foil and a nickel foil. It is most desirable to use a copper foil for the negative electrode in view of, for example, the electrochemical stability and the flexibility in the winding step. Also, it is desirable for the thickness of the foil to fall within a range from 8 $\mu$m to 15 $\mu$m.

It is desirable for the anode material layer formed on one surface of the current collector to have a thickness falling within a range from 30 $\mu$m to 100 $\mu$m. If the thickness of the anode material layer noted above falls within the range noted above, the high rate discharge characteristics of the secondary battery are improved. It is more desirable for the thickness in question to fall within a range from 50 $\mu$m to 65 $\mu$m.

In the negative electrode, it is desirable for the loading density of the anode material layer after the pressing step to be at least 1.35 g/cm$^3$, more desirably to be at least 1.4 g/cm$^3$. If the loading density exceeds 1.4 g/cm$^3$, it is certainly possible to increase the capacity of the secondary battery. However, if the loading density is excessively high, the high rate discharge characteristics of the secondary battery tend to be lowered. Such being the situation, it is desirable for the upper limit of the loading density of the anode material layer to be 1.5 g/cm$^3$.

c) Nonaqueous Electrolyte

The nonaqueous electrolyte used in the present invention includes, for example, a liquid nonaqueous electrolyte, a polymer gel-like electrolyte, a polymer solid electrolyte, and an inorganic solid electrolyte having a lithium ionic conductivity.

The liquid nonaqueous electrolyte can be prepared by, for example, dissolving an electrolyte in a nonaqueous solvent. The polymer gel-like electrolyte contains the liquid nonaqueous electrolyte and a polymer material for holding the liquid nonaqueous electrolyte. Further, the polymer solid electrolyte contains an electrolyte and a polymer material for holding the electrolyte.

The nonaqueous solvent used in the present invention includes, for example, cyclic carbonates such as propylene carbonate (PC) and ethylene carbonate (EC), chain-like carbonates such as dimethyl carbonate (DMC), methyl ethyl carbonate (MEC) and diethyl carbonate (DEC), chain-like ethers such as 1,2-dimethoxy ethane (DME) and diethoxy ethane (DEE), cyclic ethers such as tetrahydrofuran (THF) and 2-methyl tetrahydrofuran (2-MeTHF), a crown ether, fatty acid esters such as $\gamma$-butyrolactone ($\gamma$-BL), nitrogen compounds such as acetonitrile (AN), and sulfur compounds such as sulfolane (SL) and dimethyl sulfoxide (DMSO). It is possible to use as the nonaqueous solvent at least one kind of the compound selected from among the compounds exemplified above.

Particularly, it is desirable to use a nonaqueous solvent consisting of at least one kind of the solvent selected from the group consisting of EC, PC and $\gamma$-BL, or a mixed solvent comprising at least one kind of the nonaqueous solvent selected from the group consisting of EC, PC and $\gamma$-BL and at least one kind of another nonaqueous solvent selected from the group consisting of DMC, MEC, DEC, DME, DEE, THF, 2-MeTHF and AN. Also, where a material containing a carbonaceous material capable of absorbing-desorbing lithium ions is used for preparing the negative electrode, it is desirable to use a mixed solvent comprising EC, PC and $\gamma$-BL, a mixed solvent comprising EC, PC and MEC, a mixed solvent comprising EC, PC and DEC, a mixed solvent comprising EC, PC and DEE, a mixed solvent comprising EC an AN, a mixed solvent comprising EC and MEC, a mixed solvent comprising PC and DMC, a mixed solvent comprising PC and DEC or a mixed solvent comprising EC and DEC in order to prolong the charge-discharge cycle life of the secondary battery.

The electrolyte used in the present invention includes, for example, lithium salts such as lithium perchlorate (LiClO$_4$), lithium hexafluoro phosphate (LiPF$_6$), lithium tetrafluoro borate (LiBF$_4$), lithium hexafluoro arsenate (LiAsF$_6$), lithium trifluoro meta-sulfonate (LiCF$_3$SO$_3$), lithium aluminum tetrachloride (LiAlCl$_4$), and bis-trifluoromethyl sulfonyl imide lithium [LiN(CF$_3$SO$_2$)$_2$]. Particularly, it is desirable to use LiPF$_6$, LiBF$_4$ and LiN(CF$_3$SO$_2$)$_2$ because these electrolytes permit improving the conductivity and the safety of the secondary battery.

It is desirable for the amount of the electrolyte dissolved in the nonaqueous solvent to fall within a range from 0.5 mol/L to 2.0 mol/L.

The gel-like nonaqueous solvent used in the present invention is prepared by dissolving the nonaqueous solvent noted above and the electrolyte in a polymer material so as to form a gel state. The polymer material used in the present invention includes, for example, polyacrylonitrile, polyacrylate, polyvinylidene fluoride (PVdF), polyethylene oxide (PEO), a copolymer containing acrylonitrile, acrylate, vinylidene fluoride or ethylene oxide as a monomer unit, and vinylidene fluoride-hexafluoro propylene copolymer.

The solid electrolyte used in the present invention is prepared by dissolving the electrolyte noted above in a polymer material, followed by solidifying the resultant solution. The polymer material used for preparing the solid electrolyte includes, for example, polyacrylonitrile, polyvinylidene fluoride (PVdF), polyethylene oxide (PEO) and a copolymer containing acrylonitrile, vinylidene fluoride or ethylene oxide as a monomer unit.

Further, the inorganic solid electrolyte used in the present invention includes, for example, a ceramic material containing lithium such as Li$_3$N, and Li$_3$PO$_4$—Li$_2$S—SiS$_2$ glass.

An example of a cylindrical nonaqueous electrolyte secondary battery, which is one embodiment of the nonaqueous electrolyte secondary battery of the present invention, will now be described with reference to FIGS. 1 to 7.

Figure 1:
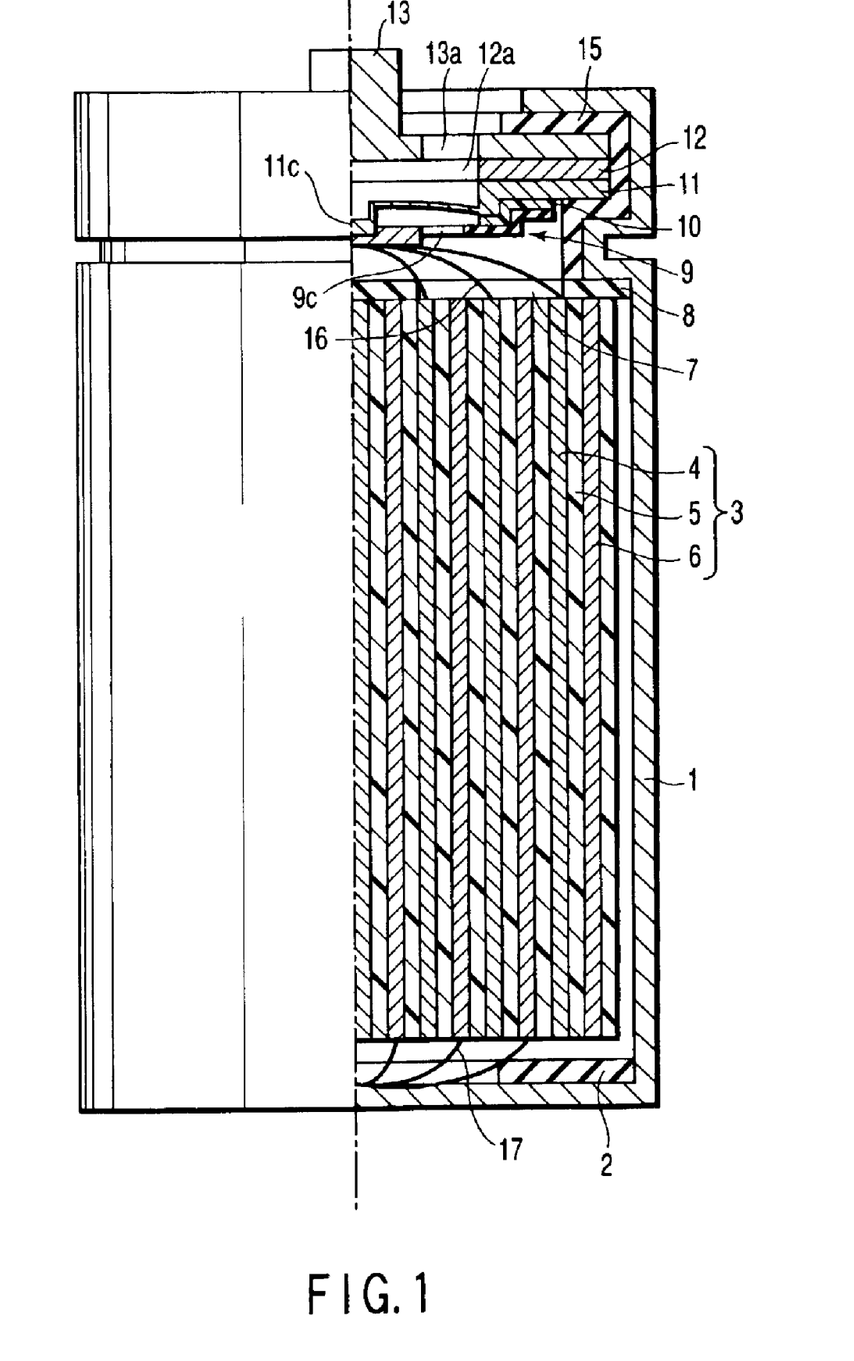
FIG. 1 is a partial cross sectional view exemplifying the construction of a nonaqueous electrolyte secondary battery of the present invention.
Figure 2:
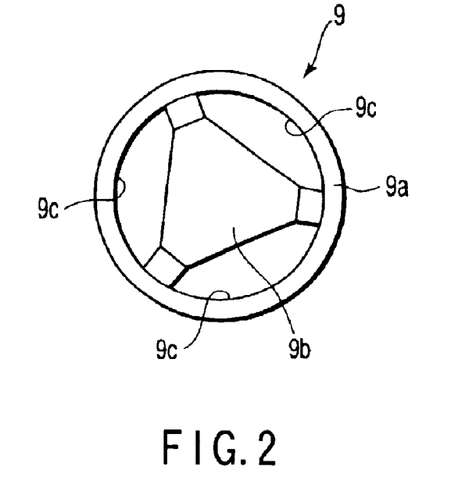
FIG. 2 is a schematic drawing for explaining the lead-fixing member incorporated in the nonaqueous electrolyte secondary battery shown in FIG. 1.
Figure 3:
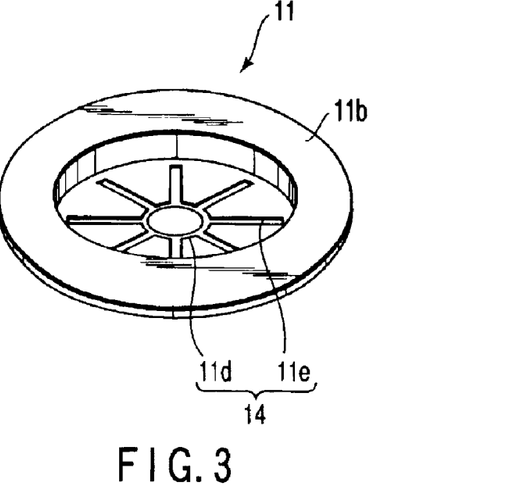
FIG. 3 is an oblique views showing the construction of the safety vent incorporated in the nonaqueous electrolyte secondary battery shown in FIG. 1.
Figure 4:
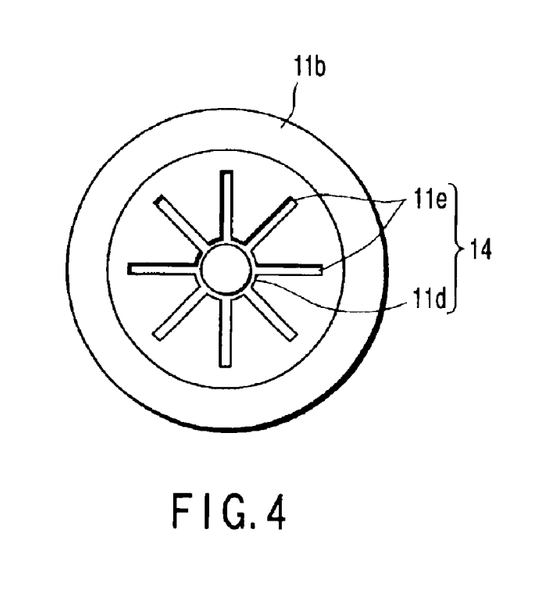
FIG. 4 is a plan view showing the safety vent shown in FIG. 3 as viewed from the bottom side.
Figure 5:
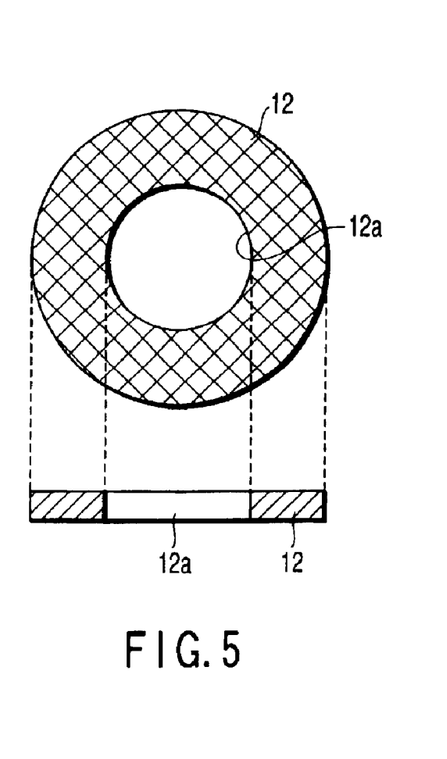
FIG. 5 is a schematic drawing for explaining the conductive support plate incorporated in the nonaqueous electrolyte secondary battery shown in FIG. 1.
Figure 6:
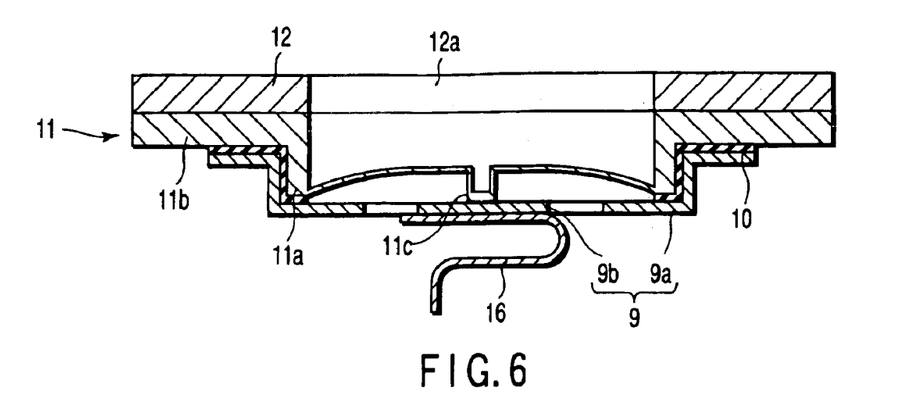
FIG. 6 is a cross sectional view showing in a magnified fashion the sealing unit and the positive electrode lead incorporated in the nonaqueous electrolyte secondary battery shown in FIG. 1.
Figure 7:
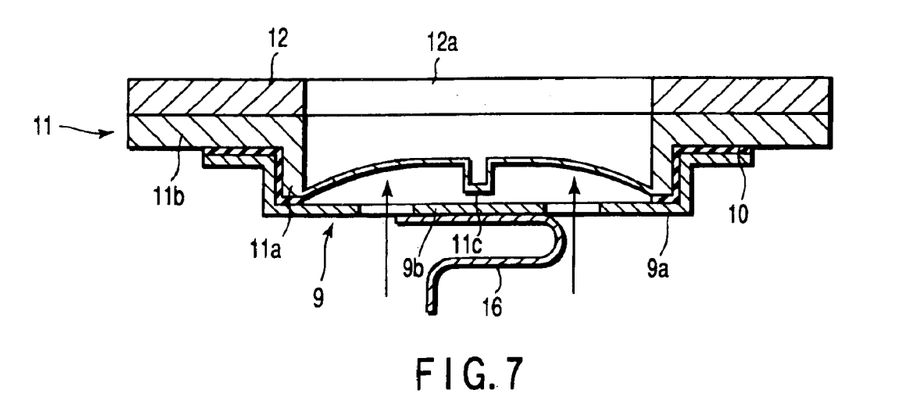
FIG. 7 is a cross sectional view showing in a magnified fashion the operating state of the current breaking mechanism included in the nonaqueous electrolyte secondary battery shown in FIG. 1.

FIG. 1 is a partial cross sectional view exemplifying the construction of a nonaqueous electrolyte secondary battery of the present invention. FIG. 2 is a schematic drawing for explaining the lead-fixing member incorporated in the nonaqueous electrolyte secondary battery shown in FIG. 1. FIG. 3 is an oblique views showing the construction of the safety vent incorporated in the nonaqueous electrolyte secondary battery shown in FIG. 1. FIG. 4 is a plan view showing the safety vent shown in FIG. 3 as viewed from the bottom side. FIG. 5 is a schematic drawing for explaining the conductive support plate incorporated in the nonaqueous electrolyte secondary battery shown in FIG. 1. FIG. 6 is a cross sectional view showing in a magnified fashion the sealing member and the positive electrode lead incorporated in the nonaqueous electrolyte secondary battery shown in FIG. 1. Further, FIG. 7 is a cross sectional view showing in a magnified fashion the operating state of the current breaking mechanism included in the nonaqueous electrolyte secondary battery shown in FIG. 1.

As shown in FIG. 1, the nonaqueous electrolyte secondary battery of the present invention comprises a cylindrical case 1. The case 1 is made of a metal such as an iron material having, for example, nickel plated to the surface. The case 1 also acts as a negative electrode terminal. An annular insulator 2 is arranged in the bottom portion of the case 1, and an electrode group 3 is housed in the case 1. The electrode group 3 is prepared by spirally winding a band-like structure comprising a positive electrode 4, a separator 5 and a negative electrode 6, which are laminated in the order mentioned. The separator 5 is formed of, for example, an unwoven fabric, a polypropylene porous film, a polyethylene porous film, or a polyethylene-polypropylene porous laminate film.

A liquid nonaqueous electrolyte is housed in the case 1. A circular electrode group holding plate 8 having a gas releasing hole 7 made therein is arranged on the electrode group 3. Further, a sealing member comprises a lead-fixing member 9, an annular insulating member 10, a safety vent 11, a conductive support plate 12 and a positive electrode terminal 13.

The lead-fixing member 9 comprises a circular frame 9a and a lead connecting plate 9b formed integral with the frame 9a. Each of three spaces 9c formed between the frame 9a and the lead connecting plate 9b performs the function of a gas-releasing hole. The lead connecting plate 9b has a first surface in contact with the safety vent and a second surface to which is connected the positive electrode lead. Also, the lead-fixing member 9 is formed of a metal such as aluminum or an aluminum alloy.

The annular insulating member 10 is arranged within the lead-fixing member 9. Also, the insulating member 10 is made of a resin such as polypropylene.

The safety vent 11 is in the shape of a dish having a circular recess portion 11a and an annular peripheral portion 11b surrounding the upper edge of the recess portion 11a. A projection 11c in contact with the first surface of the lead connecting plate 9b is formed on the bottom surface of the recess portion 11a. A rupture portion 14 comprises an annular thin portion lid formed on the bottom surface of the recess portion 11a and a thin portion lie radially extending outward from the thin portion 11d. Since the peripheral portion 11b of the safety vent 11 is arranged on the annular insulating member 10, the projection 11c alone on the bottom surface of the safety vent 11 is brought into contact with the lead connecting plate 9b of the lead-fixing member 9. In other words, the electrical connection between the safety vent 11 and the lead-fixing member 9 is achieved by the connection in only one point. The safety vent 11 is made of a metal such as aluminum or an aluminum alloy. It is desirable for the peripheral portion 11b of the safety vent 11 to have a thickness falling within a range from 0.25 mm to 0.5 mm.

FIG. 5 is a plan view and a vertical cross sectional view of the conductive support plate 12. As shown in FIG. 5, the conductive support plate 12 is in the shape of a circular disk having a gas-releasing hole 12a formed in the central portion. The conductive support plate 12 of the particular construction is mounted on the peripheral portion 11b of the safety vent 11.

The positive electrode terminal 13 is in the shape of a hat and is provided with a plurality of gas-releasing holes 13a. The positive electrode terminal 13 is made of a metal such as an iron material having, for example, nickel plated to the surface.

The sealing member (sealing unit) of the construction described above is caulked to the open portion of the case 1 with an annular insulating gasket 15 interposed therebetween.

The positive electrode lead 16 is connected at one end to the positive electrode 4 and is connected at the other end to the second surface of the lead connecting plate 11b included in the lead-fixing member 9. In other words, a current passageway in respect of the positive electrode is formed such that the current flows from the positive electrode 4 of the electrode group 3 so as to reach the positive electrode terminal 13 through the positive electrode lead 16, the lead-fixing member 9, the safety vent 11 and the conductive support plate 12.

On the other hand, the negative electrode lead 17 is connected at one end to the negative electrode 6 and is connected at the other end to the inner surface on the bottom portion of the case 1 through the open portion of the insulator 2.

If an abnormal current flows within the nonaqueous electrolyte secondary battery of the construction described above because of occurrence of an abnormality such as an overcharge so as to generate a gas, pressure is applied to the bottom portion of the safety vent 11 through the gas-releasing hole 9c of the lead-fixing member 9. If the projection 11c is moved upward by the pressure thus applied as shown in FIG. 7, the current passageway leading from the positive electrode lead 16 to reach the positive electrode terminal 13 is broken, thereby cutting away the abnormal current.

Also, since the safety vent 11 is pushed against the insulating gasket 15 and the insulating member 10 by the conductive support plate 12, the peripheral portion 11b of the safety vent 11 is prevented from being deformed by the internal pressure of the cell. As a result, the nonuniformity in the operating pressure of the safety vent 11 can be diminished so as to maintain the state that the rupture portion 14 can be broken by a designed internal pressure of the cell. It follows that the gas is released to the outside through the ruptured portion, the gas-releasing hole 12a and the gas-releasing hole 13a of the positive electrode terminal so as to make it possible to prevent the explosion of the battery with a good reproducibility.

As described above, the safety vent 11 performs both of the current interruption device and the gas releasing device so as to prevent the explosion and ignition of the secondary battery in the event of an abnormality such as an overcharge in the secondary battery. At the same time, according to the nonaqueous electrolyte secondary battery of the present invention, it is possible to improve high rate discharge characteristics.

Incidentally, the conductive support plate 12 is annular in the embodiment described above, as shown in FIG. 5. However, it is not absolutely necessary for the conductive support plate 12 to be shaped annular. Particularly, it is desirable for the conductive support plate to have a main surface that is shaped equal to the shape of the main surface of the peripheral portion of the safety vent because, in this case, the entire main surface of the peripheral portion of the safety vent can be brought into contact with the main surface of the conductive support plate so as to fix the peripheral portion of the safety vent without fail. Incidentally, it is possible for the thickness of the conductive support plate to be equal to or to differ from the thickness in the peripheral portion of the safety vent.

Some Examples of the present invention will now be described in detail with reference to FIGS. 1 to 7.

EXAMPLE 1

<Conductive Support Plate>

Prepared was a conductive support plate shaped like an annular flat plate as shown in FIG. 5 and containing 100% by weight of nickel. The support plate was sized at 16.3 mm in the outer diameter, 9.8 mm in the diameter of the central hole, and 0.31 mm in the thickness. The size of the conductive support plate was substantially equal to that of the conventional PTC element. However, the conductive support plate did not have the PTC characteristics. Also, the nickel-containing support plate had an area resistance value RS at 20° C. of 0.21 $\mu\Omega\cdot cm^2$.

Further, according to "International Tables of Selected Constants, 16, Metals, Thermal and Mechanical Data" given in Tables 1 and 2•3•1 on page 35 of "Kinzoku (Metal) Data Book, Second Revision" compiled by Nippon Metal Institute and published by Maruzen K. K. on Jan. 30, 1984, the modulus of elasticity (Young's modulus) at 25° C. of nickel, which is obtained by converting the unit "dyn/cm$^2$" in the Table given above into "Pa", is $2.05 \times 10^{11}$ Pa.

<Preparation of Positive Electrode>

A mixture containing 90% by weight of LiCoO$_2$, 3% by weight of acetylene black, 3% by weight of graphite, and 4% by weight of polyvinylidene fluoride was prepared by adding a LiCoO$_2$ powder, an acetylene black used as a conductive agent, and graphite used as a conductive agent to a solution prepared by dissolving polyvinylidene fluoride in N-methyl-2-pyrrolidone, followed by stirring the solution. Then, both surfaces of an aluminum foil having a thickness of 20 $\mu$m were coated with the mixture thus prepared, followed by drying the coating and subsequently pressing the dried coating by using a roller press machine so as to prepare a positive electrode having a thickness of 140 $\mu$m.

<Preparation of Negative Electrode>

A mesophase pitch carbon fiber was carbonized at 1,000° C. under an argon gas atmosphere, followed by pulverizing appropriately the carbonized material in a manner to allow the pulverized material to contain 90% by volume of particles having a particle diameter of 1 to 80 $\mu$m, to have an average fiber length of 30 $\mu$m and an average fiber diameter of 11 $\mu$m, and to decrease the amount of the pulverized particles having a particle diameter not larger than 0.5 $\mu$m to 5% or less, and subsequently graphitizing the pulverized particles at 3,000° C. under an argon gas atmosphere, thereby obtaining a carbonaceous material.

Then, a negative electrode mixture containing 86% by weight of the carbonaceous material, 10% by weight of an artificial graphite, and 4% by weight of polyvinylidene fluoride was prepared by adding the carbonaceous material prepared as above and a synthetic graphite to a solution prepared by dissolving polyvinylidene fluoride in N-methyl-2-pyrrolidone, followed by stirring the solution. The both surfaces of a copper foil having a thickness of 12 $\mu$m were coated with the negative electrode mixture prepared as above, followed by drying the coating and, then, pressing the dried coating by using a roller press machine so as to prepare a negative electrode. In preparing the negative electrode, the loading density and the electrode length were adjusted so as to allow the ratio (capacity balance) of the design capacity of the negative electrode after the pressing step to the design capacity of the positive electrode after the pressing step to be not smaller than 1.05 and not larger than 1.1.

<Preparation of Liquid Nonaqueous Electrolyte>

A liquid nonaqueous electrolyte was prepared by dissolving lithium hexafluoro phosphate (LiPF$_6$) in a mixed solvent prepared by mixing ethylene carbonate (EC) with methyl ethyl carbonate (MEC) at a mixing ratio EC:MEC by volume of 1:2.

<Assembly of Battery>

A positive electrode lead made of aluminum was welded to the positive electrode, and a negative electrode lead made of nickel was welded to the negative electrode. Then, the positive electrode, a separator formed of a porous polyethylene film and having a thickness of 25 $\mu$m, and the negative electrode were laminated one upon the other in the order mentioned, followed by spirally winding the resultant laminate structure, thereby preparing an electrode group.

The electrode group thus prepared was housed in a cylindrical case and made of an iron sheet plated with nickel, followed by welding the negative electrode lead to the bottom portion of the cylindrical case and welding the positive electrode lead to the second surface of the lead connecting plate of the lead-fixing member made of aluminum.

In the next step, the liquid nonaqueous electrolyte was poured into the cylindrical case so as to permit the liquid nonaqueous electrolyte to permeate sufficiently the electrode group. Then, a safety vent having the dish structure as shown in FIGS. 3 and 4, having a thickness of 0.3 mm in the peripheral portion and made of aluminum was arranged on the lead-fixing member with an annular insulating member made of polypropylene interposed therebetween. After a support plate containing nickel was disposed on the peripheral portion of the safety vent, a positive electrode terminal made of an iron sheet plated with nickel was arranged on the support plate so as to obtain a sealing member (sealing unit). The sealing member thus obtained was caulked to the open portion of the case with an insulating gasket interposed therebetween.

As described above, assembled was a cylindrical lithium-ion secondary cell (size of 18650) having a designed capacity of 1,500 mAh and constructed as shown in FIG. 1, as one embodiment of the lithium-ion secondary battery.

EXAMPLE 2

Prepared was a nickel-containing support plate containing 100% by weight of nickel, having the outer diameter and the diameter of the central hole equal to those in Example 1 described above, and having a thickness of 0.5 mm. The area resistance value of the support plate at 20° C. was found to be 0.35 $\mu\Omega\cdot cm^2$.

A cylindrical lithium-ion secondary cell (size of 18650) having a designed capacity of 1,500 mAh as one embodiment of the lithium-ion secondary battery was prepared as in Example 1, except that used was the nickel-containing support plate noted above as a conductive support plate and that the caulking height was adjusted to ensure the gastight condition inside the cell.

EXAMPLE 3

Prepared was an annular support plate containing 100% by weight of copper, and having the outer diameter, the diameter of the central hole, and the thickness exactly equal to those in Example 1 described above. The area resistance value of the support plate at 20° C. was found to be 0.05 $\mu\Omega\cdot cm^2$.

Further, according to the literature "International Tables of Selected Constants, 16, Metals, Thermal and Mechanical Data" referred to previously, the modulus of elasticity (Young's modulus) at 25° C. of copper, which is obtained by converting the unit "dyn/cm$^2$" in the Table given above into "Pa", is $1.36 \times 10^{11}$ Pa.

A cylindrical lithium-ion secondary cell (size of 18650) having a designed capacity of 1,500 mAh as one embodiment of the lithium-ion secondary battery was prepared as in Example 1, except that used was the copper-containing support plate noted above as a conductive support plate.

EXAMPLE 4

Prepared was an annular support plate containing 100% by weight of iron plated with nickel, and having the outer diameter, the diameter of the central hole, and the thickness exactly equal to those in Example 1 described above. The area resistance value of the support plate at 20° C. was found to be 0.30 $\mu\Omega \cdot cm^2$.

Further, according to the literature "International Tables of Selected Constants, 16, Metals, Thermal and Mechanical Data" referred to previously, the modulus of elasticity (Young's modulus) at 25° C. of iron, which is obtained by converting the unit "dyn/$cm^2$" in the Table given above into "Pa", is $1.9 \times 10^{11}$ Pa.

A cylindrical lithium-ion secondary cell (size of 18650) having a designed capacity of 1,500 mAh as one embodiment of the lithium-ion secondary battery was prepared as in Example 1, except that used was the support plate noted above as a conductive support plate.

EXAMPLE 5

Prepared was an annular support plate consisting essentially of a three layer structure consisting of a nickel layer, a copper layer and a nickel layer. This annular support plate has a modulus of elasticity (Young's modulus) at 25° C. of $1.5 \times 10^{11}$ Pa. As described above, each of the modulus of elasticity (Young's modulus) at 25° C. of nickel and the modulus of elasticity (Young's modulus) at 25° C. of copper falls within a range from $1 \times 10^{11}$ Pa to $3.27 \times 10^{11}$ Pa. It follows that the conductive support plate for Example 5 contains 100% by weight of the elements having the Young's modulus at 25° C. falling within a range from $1 \times 10^{11}$ Pa to $3.27 \times 10^{11}$ Pa.

The three layer structure was a clad processed product in which a copper plate having a thickness of 0.2 mm was sandwiched between two nickel thin plates each having a thickness of 0.05 mm. In other words, the total thickness of the two nickel plates, with the thickness of the copper plate being set at 1, was 0.5. Also, the outer diameter and the diameter of the central hole of the support plate were exactly equal to those in Example 1. Further, the area resistance value at 20° C. of the support plate was found to be 0.10 $\mu\Omega \cdot cm^2$.

A cylindrical lithium-ion secondary cell (size of 18650) having a designed capacity of 1,500 mAh as one embodiment of the lithium-ion secondary battery was prepared as in Example 1, except that used was the support plate noted above as a conductive support plate.

EXAMPLE 6

Used was an annular support plate containing 100% by weight of molybdenum, and having the outer diameter, the diameter of the central hole, and the thickness exactly equal to those in Example 1 described above. The area resistance value of the support plate at 20° C. was found to be 0.16 $\mu\Omega \cdot cm^2$.

Further, according to the literature "International Tables of Selected Constants, 16, Metals, Thermal and Mechanical Data" referred to previously, the modulus of elasticity (Young's modulus) at 25° C. of molybdenum, which is obtained by converting the unit "dyn/$cm^2$" in the Table given above into "Pa", is $3.27 \times 10^{11}$ Pa.

A cylindrical lithium-ion secondary cell (size of 18650) having a designed capacity of 1,500 mAh as one embodiment of the lithium-ion secondary battery was prepared as in Example 1, except that used was the support plate noted above as a conductive support plate.

EXAMPLE 7

Used was an annular support plate containing 100% by weight of a nickel-iron alloy that has a modulus of elasticity (Young's modulus) at 25° C. of $2.2 \times 10^{11}$ Pa. The outer diameter, the diameter of the central hole, and the thickness of the support plate were exactly equal to those in Example 1 described previously. Further, the area resistance value at 20° C. of the support plate was found to be 1.24 $\mu\Omega \cdot cm^2$.

A cylindrical lithium-ion secondary cell (size of 18650) having a designed capacity of 1,500 mAh as one embodiment of the lithium-ion secondary battery was prepared as in Example 1, except that used was the support plate noted above as a conductive support plate.

EXAMPLE 8

An annular copper plate having a thickness of 0.3 mm and also having each main surface plated with a Ni layer having a thickness of 3 $\mu m$ was prepared as the conductive support plate. The outer diameter and the diameter of the central hole of the support plate were exactly equal to those in Example 1. The nickel-plated copper plate providing the support plate exhibited a modulus of elasticity (Young's modulus) at 25° C. of $1.39 \times 10^{11}$ Pa. It follows that the support plate contained 100% by weight of the metal elements that have a modulus of elasticity (Young's modulus) at 25° C. falling within a range from $1 \times 10^{11}$ Pa to $3.27 \times 10^{11}$ Pa. Also, the total thickness of the two Ni plating layers was 6 $\mu m$, and the area resistance value at 20° C. of the support plate was 0.055 $\mu\Omega \cdot cm^2$.

A cylindrical lithium-ion secondary cell (size of 18650) having a designed capacity of 1,500 mAh as one embodiment of the lithium-ion secondary battery was prepared as in Example 1, except that used was the support plate noted above as a conductive support plate.

EXAMPLE 9

An annular copper plate having a thickness of 0.17 mm and also having each main surface plated with a Ni layer having a thickness of 3 $\mu m$ was prepared as the conductive support plate. The outer diameter and the diameter of the central hole of the support plate were exactly equal to those in Example 1. The nickel-plated copper plate providing the support plate exhibited a modulus of elasticity (Young's modulus) at 25° C. of $1.37 \times 10^{11}$ Pa. It follows that the support plate contained 100% by weight of the metal elements that have a modulus of elasticity (Young's modulus) at 25° C. falling within a range from $1 \times 10^{11}$ Pa to $3.27 \times 10^{11}$ Pa. Also, the total thickness of the two Ni plating layers was 6 $\mu m$, and the area resistance value at 20° C. of the support plate was 0.032 $\mu\Omega \cdot cm^2$.

A cylindrical lithium-ion secondary cell (size of 18650) having a designed capacity of 1,500 mAh as one embodiment of the lithium-ion secondary battery was prepared as in Example 1, except that used was the support plate noted above as a conductive support plate.

COMPARATIVE EXAMPLE 1

Prepared was an annular support plate made of tungsten having a modulus of elasticity (Young's modulus) at 25° C. of $4.027 \times 10^{11}$ Pa according to the literature "International Tables of Selected Constants, 16, Metals, Thermal and Mechanical Data" referred to previously. The area resistance value of the support plate at 20° C. was found to be 0.18 $\mu\Omega \cdot cm^2$.

A cylindrical lithium-ion secondary cell (size of 18650) having a designed capacity of 1,500 mAh as one embodiment of the lithium-ion secondary battery was prepared as in Example 1, except that used was the support plate noted above as a conductive support plate and that the caulking height was adjusted to ensure the gastight condition inside the cell.

COMPARATIVE EXAMPLE 2

Prepared was an annular support plate made of aluminum having a modulus of elasticity (Young's modulus) at 25° C. of $0.757 \times 10^{11}$ Pa according to the literature "International Tables of Selected Constants, 16, Metals, Thermal and Mechanical Data" referred to previously. The outer diameter, the diameter of the central hole and the thickness of the annular support plate were exactly equal to those in Example 1 referred to previously. In general, the modulus of elasticity (Young's modulus) tends to be lowered with decrease in temperature. Since the temperature coefficient is small in respect of the Young's modulus of aluminum, the Young's modulus at 25° C. of aluminum is smaller than $1 \times 10^{11}$ Pa. In addition, the area resistance value of the annular support plate at 20° C. was found to be 0.082 $\mu\Omega \cdot cm^2$.

A cylindrical lithium-ion secondary cell (size of 18650) having a designed capacity of 1,500 mAh as one embodiment of the lithium-ion secondary battery was prepared as in Example 1, except that used was the annular support plate noted above as a conductive support plate.

COMPARATIVE EXAMPLE 3

Prepared was an annular support plate made of titanium having a modulus of elasticity (Young's modulus) at 25° C. of $1.142 \times 10^{11}$ Pa according to the literature "International Tables of Selected Constants, 16, Metals, Thermal and Mechanical Data" referred to previously. The outer diameter, the diameter of the central hole and the thickness of the annular support plate were exactly equal to those in Example 1 referred to previously. In addition, the area resistance value of the annular support plate at 20° C. was found to be 1.3 $\mu\Omega \cdot cm^2$.

A cylindrical lithium-ion secondary cell (size of 18650) having a designed capacity of 1,500 mAh as one embodiment of the lithium-ion secondary battery was prepared as in Example 1, except that used was the annular support plate noted above as a conductive support plate.

COMPARATIVE EXAMPLE 4

Prepared was an annular support plate made of copper having a modulus of elasticity (Young's modulus) at 25° C. of $1.36 \times 10^{11}$ Pa according to the literature "International Tables of Selected Constants, 16, Metals, Thermal and Mechanical Data" referred to previously. The outer diameter and the diameter of the central hole of the annular support plate were exactly equal to those in Example 1 referred to previously. However, the thickness of the annular support plate was 0.17 mm. Also, the area resistance value of the annular support plate at 20° C. was found to be 0.028 $\mu\Omega \cdot cm^2$.

A cylindrical lithium-ion secondary cell (size of 18650) having a designed capacity of 1,500 mAh as one embodiment of the lithium-ion secondary battery was prepared as in Example 1, except that used was the annular support plate noted above as a conductive support plate.

A plurality of lithium-ion secondary cells thus obtained were prepared for each of Examples 1 to 9 and Comparative Examples 1 to 4 so as to evaluate the high rate discharge characteristics of the secondary battery. In this case, the high rate discharge characteristics of the secondary battery were defined by the ratio of discharge capacities that were obtained when the cell was discharged under two different current values. Specifically, measured were the discharge capacity (5C), which was obtained when the cell was discharged under the current 5C, and the discharge capacity (0.2C), which was obtained when the cell was discharged under the current 0.2C. Incidentally, the current of 1,500 mA required for discharging the nominal capacity, which is 1,500 mAh, of the cell in an hour is the current 1C. The ratio of the discharge capacity (5C) under the current 5C to the discharge capacity (0.2C) under the current 0.2C, i.e., the value X (%) calculated by formula (2) given below, represents the high rate discharge capacity ratio:

$$X(\%) = (C_{5C}/C_{0.2C}) \times 100 \qquad (2)$$

where $C_{5C}$ represents the discharge capacity under the current 5C, and $C_{0.2C}$ represents the discharge capacity under the current 0.2C.

The high rate discharge capacity ratios thus obtained are shown in Tables 1 and 2 given below:

TABLE 1

|  | Conductive support plate | | | High rate discharge capacity ratio (%) | Rank for evaluating overcharging test |
|---|---|---|---|---|---|
|  | Material | Modulus of elasticity ($10^{11}$ Pa) | Area resistance value ($\mu\Omega \cdot cm^2$) | | |
| Example 1 | Nickel | 2.05 | 0.21 | 95 | AA |
| Example 2 | Nickel | 2.05 | 0.35 | 91 | AA |
| Example 3 | Copper | 1.36 | 0.05 | 98 | AA |
| Example 4 | Iron plated with nickel | 1.9 | 0.30 | 91 | AA |
| Example 5 | Clad material (Ni/Cu/Ni) | 1.5 | 0.10 | 97 | AA |
| Example 6 | Molybdenum | 3.27 | 0.16 | 95 | A |
| Example 7 | Nickel-iron alloy | 2.2 | 1.24 | 85 | AA |
| Example 8 | Copper plated with nickel | 1.39 | 0.055 | 98 | AA |
| Example 9 | Copper plated with nickel | 1.37 | 0.032 | 98 | A |

TABLE 2

|  | Conductive support plate | | | High rate discharge capacity ratio (%) | Rank for evaluating overcharging test |
|---|---|---|---|---|---|
|  | Material | Modulus of elasticity ($10^{11}$ Pa) | Area resistance value ($\mu\Omega \cdot cm^2$) | | |
| Comparative Example 1 | Tungsten | 4.027 | 0.18 | 98 | C |
| Comparative Example 2 | Aluminum | 0.757 | 0.082 | 97 | B |
| Comparative Example 3 | Titanium | 1.142 | 1.3 | 79 | A |
| Comparative Example 4 | Copper | 1.36 | 0.028 | 98 | C |

As apparent from Tables 1 and 2, the high rate discharge capacity ratio has been found to be not lower than 80% in the secondary battery for each of Examples 1 to 9 using the conductive support plate having the area resistance value RS falling within a range from 0.032 $\mu\Omega\cdot cm^2$ to 1.24 $\mu\Omega\cdot cm^2$, supporting the excellent high rate discharge characteristics of the secondary battery for each of Examples 1 to 9. Particularly, the high rate discharge capacity ratio of each of the secondary battery for Example 1 using a nickel-containing conductive support plate having a thickness of 0.31 mm and the secondary battery for Example 3 using a copper-containing conductive support plate has been found to be not lower than 95%, supporting particularly excellent high rate discharge characteristics.

On the other hand, the high rate discharge capacity ratio of the secondary battery for Comparative Example 3 using a conductive support plate having the area resistance value RS being 1.3 $\mu\Omega\cdot cm^2$ has been found to be lower than 80%. In other words, the high rate discharge characteristics of the secondary battery were not satisfactory.

Also, an overcharging test, in which the cell was rapidly charged under the current of 7.5 A (5C) so as to charge the cell up to 200% of the rated capacity, was applied to the secondary battery for each of Examples 1 to 9 exhibiting the high rate discharge capacity ratio not lower than 80% and the Comparative Examples. The overcharging test was conducted on the assumption of a disorder of the charger. Tables 1 and 2 also show the results. One hundred test samples were prepared for each Example and each Comparative Example, and each of the evaluation ranks AA, A, B, and C given in Tables 1 and 2 was determined on the basis of ratio G of the test samples, in which the safety vent operated normally so as to prevent the explosion and ignition of the sample of the cell, to 100 test samples of the cell. To be more specific, the evaluation rank AA denotes the case where the ratio G noted above fell within a range from 98% to 100%. The evaluation rank A denotes the case where the ratio G was not lower than 95% and lower than 98%. The evaluation rank B denotes the case where the ratio G was not lower than 80% and lower than 95%. Further, the evaluation rank C denotes the case where the ratio G was lower than 80%.

As apparent from Tables 1 and 2, in the secondary battery for each of Examples 1 to 9, the safety vent normally operated so as to rupture the rupture portion and, thus, to break the current normally, with the result that the number of secondary batteries leading to the explosion and ignition was small. Particularly, the evaluation rank of the overcharging test was rank AA in the secondary battery for each of Examples 1 to 5 and 7 to 8, supporting that the secondary battery was excellent in safety.

On the other hand, the nonuniformity in the operating pressure of the safety vent was large in the secondary battery for each of the Comparative Examples 1, 2 and 4, with the result that the explosion or ignition took place in a large number of secondary battery samples.

Also, the conductive support plate for Comparative Example 3 was formed of Ti having a Young's modulus at 25° C. of $1.1\times10^{11}$ Pa and, thus, the overcharge test was evaluated as rank A.

EXAMPLE 10

Prepared was an annular support plate containing 100% by weight of nickel, and having an outer diameter of 24.3 mm, a diameter of the central hole of 14.1 mm and a thickness of 0.31 mm. The area resistance value at 20° C. of the nickel-containing support plate was found to be 0.20 $\mu\Omega\cdot cm^2$.

Further, according to "International Tables of Selected Constants, 16, Metals, Thermal and Mechanical Data" referred to previously, the modulus of elasticity (Young's modulus) at 25° C. of nickel, which is obtained by converting the unit "dyn/cm$^2$" in the Table given above into "Pa", is $2.05\times10^{11}$ Pa.

In the next step, prepared were a positive electrode and a negative electrode equal to those used in Example 1 except the electrode length. Then, two positive electrode leads each made of aluminum were welded to the positive electrode, and two negative electrode leads each made of nickel were welded to the negative electrode, followed by laminating the positive electrode thus prepared, a separator formed of a porous polyethylene film having a thickness of 25 $\mu$m, and the negative electrode thus prepared one upon the other in the order mentioned and subsequently winding spirally the resultant laminate structure, thereby preparing an electrode group.

Further, the electrode group thus prepared was housed in a battery case having a diameter of 26 mm and a height of 650 mm, and a cylindrical lithium-ion secondary cell (size of 26650) having a designed capacity of 3 Ah was assembled as in Example 1. It has been found that the function and effect similar to those obtained in Examples 1 to 9 can be obtained in the case of using the annular support plate equal to that used in each of Examples 1 to 9, though the secondary battery for Example 10 differed in size and capacity from that for Example 1.

COMPARATIVE EXAMPLE 5

Prepared was a PTC (Positive Temperature Coefficient) element of the construction that a conductive sheet formed of a mixture of a polymer and carbon was sandwiched between two nickel foils. The outer diameter, the diameter of the central hole and the thickness of the PTC element were exactly equal to those of the annular conductive support plate for Example 1. The area resistance value at 20° C. of the annular PTC element was found to be $3.2 \times 10^4$ $\mu\Omega \cdot cm^2$. Also, the PTC element contained 59% by weight of nickel.

A cylindrical lithium-ion secondary cell (size of 18650) having a designed capacity of 1,500 mAh was assembled as in Example 1, except that used was the PTC element noted above in place of the conductive support plate.

A charge-discharge cycle, in which the secondary battery obtained in Example 1 was constant current/voltage charged under a current of 1.5 A (1C) to 4.2V, followed by discharging the cell under a constant current of 7.5 A (5C) to 2.7V, was repeated 50 times. On the other hand, the secondary battery obtained in Comparative Example 5 was constant current/voltage charged to 4.2V under a current of 1.5 A (1C). Then, when it was attempted to discharge the cell under a constant current of 7.5 A (5C), the battery temperature was elevated to exceed 60° C. by the Joule heat at the end period of the discharge. As a result, the current interruption device of the PTC element was performed so as to interrupt the discharge. Under the circumstances, the secondary battery for Comparative Example 5 was discharged again under a current of 0.5C (0.75 A) after the battery temperature was lowered to 20° C., thereby discharging the cell to 2.7V. The particular charge-discharge cycle was repeated 50 times.

After the charge-discharge cycle, the cell was rapidly charged under a current of 5C to 200% of the nominal capacity. As a result, the secondary battery for Example 1 was evaluated as rank AA in which the ratio G of the number of cell samples, in which the safety vent operated normally so as to prevent the explosion and ignition of the cell, to 100 cell samples fell within a range from 98% to 100%. On the other hand, the secondary battery for Comparative Example 5 was evaluated as rank C in which the ratio G noted above was lower than 80%.

As described above, the safety of the secondary battery for Comparative Example 5 was lowered after the large current discharge was repeated. The reason for the difficulty is considered to be as follows. Specifically, the elevation and lowering of the battery temperature are repeated if the large current discharge is repeated. As a result, the thermal expansion and shrinkage of the polymer contained in the PTC element are repeated so as to thermally deteriorate the polymer and, thus, to lower the mechanical strength of the PTC element. It follows that the peripheral portion (edge portion) of the safety vent is deformed by the elevation in the internal pressure of the cell in the event of an abnormality such as an overcharge, with the result that the nonuniformity in the operating pressure of the safety vent is increased so as to lower the safety of the secondary battery.

In the secondary battery for Example 1, a metal element having a modulus of elasticity (Young's modulus) at 25° C. that falls within a range from $1 \times 10^{11}$ Pa to $3.27 \times 10^{11}$ Pa is contained in the conductive support plate in an amount not smaller than 80% by weight, with the result that it is possible to prevent the thermal deterioration of the conductive support plate when the large current discharge of the cell is repeated under high temperatures to repeat the elevation and lowering of the battery temperature. It follows that the secondary battery for Example 1 is capable of diminishing the nonuniformity in the operating pressure of the safety vent even when the high rate cycle is repeated under high temperatures.

EXAMPLE 11

A flat annular conductive support plate was prepared by sufficiently mixing 95% by weight a nickel powder and 5% by weight of Teflon (PTFE) in a mortar, followed by molding the mixture in a pressure mold. The outer diameter, the diameter of the central hole, and the thickness of the nickel-containing support plate thus prepared were exactly equal to those in Example 1. Also, the area resistance value at 20° C. of the support plate was 0.855 $\mu\Omega \cdot cm^2$. Further, the conductive support plate contained 95% by weight of the metal elements having a Young's modulus at 25° C. falling within a range from $1 \times 10^{11}$ Pa to $3.27 \times 10^{11}$ Pa.

A cylindrical lithium-ion secondary cell (size of 18650) having a designed capacity of 1,500 mAh was assembled as in Example 1, except that the support plate described above was used as the conductive support plate.

Concerning the lithium-ion secondary battery for Example 11 thus obtained, the high rate discharge characteristics were measured as in Example 1. The large current discharge ratio was found to be 87%. Also, an overcharge test was applied to the secondary battery for Example 11 as in Example 1, with the result that the safety of the secondary battery for Example 11 was evaluated as rank A.

According to the present invention, the safety vent is firmly supported by the conductive support plate. Therefore, even if the internal pressure of the cell is increased because of the occurrence of an abnormality such as an overcharge, the peripheral portion of the safety vent is not deformed. In other words, the present invention provides a secondary battery capable of suppressing the nonuniformity in the operating pressure of the safety vent so as to permit the safety vent to operate without fail, thereby preventing the explosion of the secondary battery.

As described above, the present invention provides a nonaqueous electrolyte secondary battery excellent in the high rate discharge characteristics and capable of suppressing the explosion and ignition in the event of an overcharge.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte secondary battery comprising:
   a case;
   an electrode group provided in the case and including a positive electrode, a negative electrodes, and a nonaqueous electrolyte; and
   a sealing unit arranged in an open portion of the case, the sealing unit including a conductive safety vent comprising a rupture portion that is ruptured by an increase in an internal pressure of the case, a positive electrode terminal electrically connected to the positive electrode, and a conductive support plate arranged between the conductive safety vent and the positive electrode terminal, wherein:
   the conductive support plate is formed of a composite matellic material, the composite metallic material being a clad material comprising a Cu-containing layer and Ni-containing layers formed on both surfaces of the Cu-containing layer;
   a ratio of a total thickness of the Ni-containing layers to a thickness of the Cu-containing layer is within a range between 0.1:1 and 1:1; and the conductive support plate has an area resistance value RS at 20° C. falling within a range from $0.032\ \mu\Omega\cdot cm^2$ to $1.24\ \mu\Omega\cdot cm^2$.

2. The nonaqueous electrolyte secondary battery according to claim 1, wherein the area resistance value RS at 20° C. of the conductive support plate falls within a range from $0.05\ \mu\Omega\cdot cm^2$ to $0.35\ \mu\Omega\cdot cm^2$.

3. The nonaqueous electrolyte secondary battery according to claim 1, wherein a thickness of the conductive support plate falls within a range from 0.2 mm to 0.5 mm.

4. The nonaqueous electrolyte secondary battery according to claim 1, wherein the conductive safety vent includes a recessed portion recessed downward and an annular peripheral portion arranged around an upper edge of the recessed portion, and the rupture portion is a groove formed on a surface of the recessed portion.

5. The nonaqueous electrolyte secondary battery according to claim 4, wherein the conductive safety vent is formed of aluminum or an aluminum alloy.

6. The nonaqueous electrolyte secondary battery according to claim 1, wherein the ratio of the total thickness of the Ni-containing layers to the thickness of the Cu-containing layers is within a range between 0.25:1 and 0.5:1.

7. The nonaqueous electrolyte secondary battery according to claim 1, wherein the area resistance value RS at 20° C. of the conductive support plate falls within a range from $0.05\ \mu\Omega\cdot cm^2$ to $0.21\ \mu\Omega\cdot cm^2$.

8. The nonaqueous electrolyte secondary battery according to claim 1, wherein the thickness of the conductive support plate falls within a range from 0.25 mm to 0.35 mm.

9. The nonaqueous electrolyte secondary battery according to claim 1, wherein a percentage of Ni and Cu contained in the conductive support plate is 80% by weight or more.

10. The nonaqueous electrolyte secondary battery according to claim 1, wherein a percentage of Ni and Cu contained in the conductive support plate falls within a range from 90 to 100% by weight.

11. The nonaqueous electrolyte secondary battery according to claim 1, wherein a percentage of Ni and Cu contained in the conductive support plate falls within a range from 95 to 100% by weight.

12. A nonaqueous electrolyte secondary battery comprising:

a case;

an electrode group provided in the case and including a positive electrode, a negative electrode, and a nonaqueous electrolyte; and a sealing unit arranged in an open portion of the case, the sealing unit including a conductive safety vent comprising a rupture portion that is ruptured by an increase in an internal pressure of the case, a positive electrode terminal electrically connected to the positive electrode, and a conductive support plate arranged between the conductive safety vent and the positive electrode terminal; wherein:

the conductive support plate comprises a Cu-containing plate as a supporting body, a first Ni-containing layer plated on one main surface of the Cu-containing plate and a second Ni-containing layer plated on another main surface of the Cu-containing plate;

a sum of a thickness of the first Ni-containing layer and a thickness of the second Ni-containing layer falls within a range from 2 $\mu$m to 10 $\mu$m; and the conductive support plate has an area resistance value RS 20° C. falling within a range from $0.032\ \mu\Omega\cdot cm^2$ to $1.24\ \mu\Omega\cdot cm^2$.

13. The nonaqueous electrolyte secondary battery according to claim 12, wherein the area resistance value RS of the conductive support plate falls within a range from $0.05\ \mu\Omega\cdot cm^2$ to $0.35\ \mu\Omega\cdot cm^2$.

14. The nonaqueous electrolyte secondary battery according to claim 12, wherein a thickness of the conductive support plate falls within a range from 0.2 mm to 0.5 mm.

15. The nonaqueous electrolyte secondary battery according to claim 12, wherein the sum of the thickness of the first Ni-containing layer and the thickness of the second Ni-containing layer falls within a range from 4 $\mu$m to 6 $\mu$m.

16. The nonaqueous electrolyte secondary battery according to claim 12, wherein the area resistance value RS at 20° C. of the conductive support plate falls within a range from $0.05\ \mu\Omega\cdot cm^2$ to $0.21\ \mu\Omega\cdot cm^2$.

17. The nonaqueous electrolyte secondary battery according to claim 12, wherein the thickness of the conductive support plate fails within a range from 0.25 mm to 0.35 mm.

18. The nonaqueous electrolyte secondary battery according to claim 12, wherein a percentage of Ni and Cu contained in the conductive support plate is 80% by weight or more.

19. The nonaqueous electrolyte secondary battery according to claim 12, wherein a percentage of Ni and Cu contained in the conductive support plate falls within a range from 90 to 100% by weight.

20. The nonaqueous electrolyte secondary battery according to claim 12, wherein a percentage of Ni and Cu contained in the conductive support plate falls within a range from 95 to 100% by weight.

* * * * *